(12) United States Patent
Damevin et al.

(10) Patent No.: US 11,149,565 B2
(45) Date of Patent: Oct. 19, 2021

(54) TURBINE ENGINE AIR GUIDE ASSEMBLY WITH IMPROVED AERODYNAMIC PERFORMANCE

(71) Applicant: SAFRAN AIRCRAFT ENGINES, Paris (FR)

(72) Inventors: Henri-Marie Damevin, Moissy-Cramayel (FR); Philippe Jacques Pierre Fessou, Moissy-Cramayel (FR); Vianney Christophe Marie Maniere, Moissy-Cramayel (FR); Michael Franck Antoine Schvallinger, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 184 days.

(21) Appl. No.: 15/549,584

(22) PCT Filed: Feb. 9, 2016

(86) PCT No.: PCT/FR2016/050275
§ 371 (c)(1),
(2) Date: Aug. 8, 2017

(87) PCT Pub. No.: WO2016/128665
PCT Pub. Date: Aug. 18, 2016

(65) Prior Publication Data
US 2018/0038235 A1    Feb. 8, 2018

(30) Foreign Application Priority Data

Feb. 9, 2015  (FR) ...................................... 1551011

(51) Int. Cl.
*F01D 9/04*   (2006.01)
*F02K 3/06*   (2006.01)
(Continued)

(52) U.S. Cl.
CPC ............. *F01D 9/041* (2013.01); *F01D 9/065* (2013.01); *F02K 1/52* (2013.01); *F02K 3/06* (2013.01);
(Continued)

(58) Field of Classification Search
CPC ......... F01D 9/041; F01D 9/065; B64D 27/18; B64D 27/26; B64D 2027/266; F02K 1/52;
(Continued)

(56) References Cited

U.S. PATENT DOCUMENTS 4,785,625 A * 11/1988 Stryker ...................... F02C 7/20
                                              60/226.1
5,123,242 A *  6/1992 Miller ....................... F02C 7/14
                                              165/300
(Continued)

FOREIGN PATENT DOCUMENTS

| EP | 2 169 182 A2 | 3/2010 |
| EP | 2 944 767 A1 | 11/2015 |
| FR | 3 004 749 A1 | 10/2014 |

OTHER PUBLICATIONS

FR 3004749 abstract and translation, downloaded Jun. 26, 2019.*
(Continued)

*Primary Examiner* — Ted Kim
(74) *Attorney, Agent, or Firm* — Oblon, McClelland, Maier & Neustadt, L.L.P.

(57) ABSTRACT

A turbine engine assembly including an air flow guide assembly, including at least one guide vane and at least one structural arm, the vane and arm extending radially about an axis. The arm includes an upstream end portion having a guide vane profile and including a leading edge aligned with that of the vane; a downstream portion; and an intermediate portion including an upper surface extending between an (Continued)

upstream end point and a downstream end point. The upstream end point is separated from the leading edge of the arm by an axial distance of between 0.2c and 0.5c, c being the length of the axial chord of the vane, and the angle of the tangent to the upper surface at the upstream end point is equal to that at the downstream end point ±1 degree.

7 Claims, 4 Drawing Sheets

(51) Int. Cl.
| | | |
|---|---|---|
| *F01D 9/06* | (2006.01) | |
| *F04D 29/66* | (2006.01) | |
| *F04D 29/54* | (2006.01) | |
| *F04D 29/68* | (2006.01) | |
| *F02K 1/52* | (2006.01) | |

(52) U.S. Cl.
CPC ......... *F04D 29/544* (2013.01); *F04D 29/667* (2013.01); *F04D 29/681* (2013.01); F05D 2220/36 (2013.01); F05D 2240/123 (2013.01); F05D 2260/961 (2013.01); F05D 2260/97 (2013.01)

(58) Field of Classification Search
CPC ........ F02K 3/06; F04D 29/667; F04D 29/544; F04D 29/681; F05D 2220/323; F05D 2240/12; F05D 2220/36; F05D 2240/123; F05D 2260/961; F05D 2270/17; F05D 2260/97
See application file for complete search history.

(56) References Cited

U.S. PATENT DOCUMENTS

| | | | | |
|---|---|---|---|---|
| 5,203,163 | A * | 4/1993 | Parsons | F02C 6/08 60/226.1 |
| 5,729,969 | A * | 3/1998 | Porte | F02C 6/08 60/226.1 |
| 2008/0028763 | A1* | 2/2008 | Schwarz | F01D 25/12 60/771 |
| 2009/0165463 | A1* | 7/2009 | Vauchel | B64D 29/00 60/797 |
| 2010/0080697 | A1* | 4/2010 | Wojno | F01D 9/041 415/208.2 |
| 2011/0211947 | A1* | 9/2011 | Clemen | F01D 5/141 415/211.2 |
| 2011/0255964 | A1* | 10/2011 | Clemen | F01D 5/141 415/211.2 |
| 2013/0259672 | A1* | 10/2013 | Suciu | F01D 1/04 415/208.1 |
| 2013/0259673 | A1 | 10/2013 | Waki et al. | |
| 2015/0330236 | A1 | 11/2015 | Beecroft et al. | |
| 2015/0330309 | A1* | 11/2015 | Bagnall | F02C 6/08 60/785 |

OTHER PUBLICATIONS

International Search Report dated Apr. 26, 2016, in PCT/FR2016/050275 filed Feb. 9, 2016.
International Search Report dated Apr. 26, 2016 in PCT/FR2016/050275 (with English language translation of categories of cited documents).
French Preliminary Search Report dated Jan. 14, 2016 in French Application No. FR 1551011 (with English language translation of categories of cited documents).

* cited by examiner

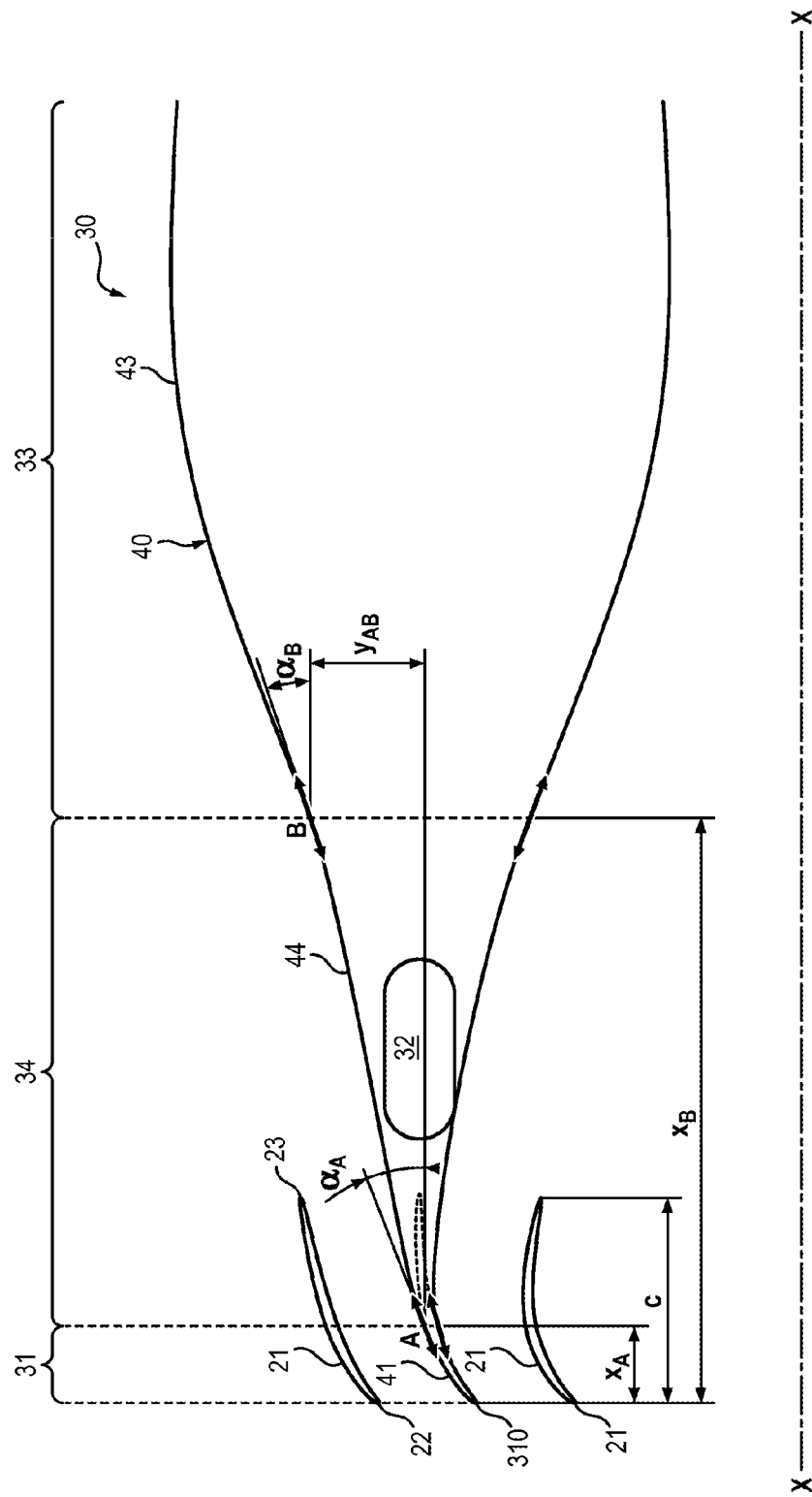

TURBINE ENGINE AIR GUIDE ASSEMBLY WITH IMPROVED AERODYNAMIC PERFORMANCE

FIELD OF THE INVENTION

The invention relates to a turbine engine air flow guide assembly comprising guide vanes and one or more structural arms. The invention applies in particular to bypass type turbine engines.

PRIOR ART

A bypass type turbine engine for aeronautical propulsion is shown in FIG. 1a. It comprises a fan 10 delivering an air flow of which a central portion, called the primary flow $F_P$, is injected into a compressor 12 which supplies a turbine 14 driving the fan.

The peripheral portion, called the secondary flow $F_S$, of the air flow is, for its part, injected toward the atmosphere to supply the major portion of the thrust of the turbine engine 1, after having passed through a fixed vane 20 ring 21 arranged downstream of the fan. This ring, called the guide 20 (also known under the acronym OGV for "outlet guide vane"), makes it possible to guide the secondary air flow at the outlet of the fan, while limiting losses to a maximum.

Shown in the same figure is a structural arm 30, which connects the ferrule 16 of the intermediate casing to the hub 17 of the intermediate casing, thus contributing to support and to hold in position the engine shaft(s) 18 and ensuring the structural strength of the assembly. The structural arm also has the function of allowing the transmission of movement or of fluids between the turbine engine and the rest of the aircraft on which it is mounted. To accomplish this, the structural arm is hollow, and makes it possible to accommodate lines, transmission shafts, etc.

Several types of structural arms exist, depending on their role and their position in the turbine engine.

For example, so-called "main" arms, the main function whereof is to support the turbine engine under the wing of the airplane, are positioned at "6 o'clock" and at "12 o'clock", i.e. vertically with respect to the airplane arranged on horizontal ground (terminology compared with the position of the hands of a watch).

So-called "auxiliary" structural arms do not have as their main function to support the turbine engine, but rather to accomplish power transmission, by being hollow to contain a transmission shaft. These arms are positioned at "8 o'clock" for example, i.e. obliquely with respect to the vertical.

All types of structural arms are also utilized to transmit utilities from the turbine engine to the rest of the airplane, i.e. for example oil lines, fuel lines, etc.

For the purpose of reducing the mass of a turbine engine and to improve its performance, it has been proposed to group the functions of a secondary guide and of a structural arm in a single part, and this for all types of structural arm.

As shown in FIG. 1b, so-called "integrated" guide vanes have been proposed, formed by a structural arm 30, in this particular case of the main type described above, of which an upstream portion is shrouded to have the aerodynamic profile of a guide vane.

Such a structural arm therefore has geometrically constrained portions, which are:
An upstream end portion 31, the geometry whereof must be that of a guide vane, A hollow zone 32 for transmitting utilities, in which are arranged lines, connection, and transmission shafts, etc. if required. This zone takes into account a considerable number of constraints of the utility volume, operating and assembly clearance, thickness of material type, etc., called a "keep-out zone," meaning that it must be kept unchanged in case of a change in geometry of the structural arm, and A downstream portion 33 forming the structural arm proper, i.e. supporting the turbine engine in position under the wing of the airplane while supporting the loads induced by the weight of the turbine engine.

A structural arm complying with these constraints therefore has an upper surface wall 40 formed successively from:
The upper surface wall of the upstream end, corresponding to an upper surface wall of a guide vane,
A transition wall, adjoining the keep-out zone 32; this wall can be made of sheet metal to lighten the turbine engine, and
The upper surface wall of the downstream portion.

The upper surface wall must in particular comply with continuity of the surfaces and of the tangents at the transitions between its different portions.

Due to the differences in dimension, in a direction transverse to the axis of the turbine engine, of the upstream end portion 31 and of the downstream portion 33, the upper surface wall of the structural arm obtained can have a relatively pronounced concavity.

Yet from an aerodynamic point of view, this solution is not favorable because it causes a slowing of the flow in the concave zone of the wall formed at the transition zone.

As shown in FIG. 1c, in which the structural arm is seen from its upper surface side looking upstream of the air flow, in this low-speed zone, the secondary corner flows Ec derived from the root and from the tip of the upstream end portion in the form of guide vane are amplified and can degenerate into separation and/or recirculation.

The result can be significant pressure losses in the flow, as well as static pressure distortions propagating upstream of the guide which can adversely affect the aerodynamic and aero-acoustic performance of the fan.

Existing solutions, such as for example the modification of guide vane profiles, the arrangement of the vanes, etc., each have limits connected with the static and dynamic mechanical strength of the vanes, the manufacturability of the vanes, etc. Moreover, these solutions, although they prepare the flow upstream of the arms, at the upstream end portion, do not allow the avoidance of certain secondary flows which can develop at the transition wall adjoining the keep-out zone.

There exists therefore a need to remedy the problems posed by this geometry.

PRESENTATION OF THE INVENTION

The invention has as its aim to mitigate the disadvantages of the prior art, by proposing an air flow guide assembly having improved aerodynamic performance compared to the prior art.

One aim of the invention is to propose an air flow guide assembly the geometry whereof eliminates the risks of air flow recirculation on the upper surface wall of a structural arm comprising an upstream guide vane end.

In this regard, the invention has as its object a turbine engine assembly, comprising:
a guide, including at least one vane, comprising a leading edge and a trailing edge, and a structural arm, wherein the vane and the arm extend radially around an axis of the turbine engine, and the structural arm has:

an upstream end portion with respect to the air flow direction in the turbine engine, comprising a leading edge aligned circumferentially with the leading edge of the vanes, having a profile identical with the upstream end of a vane, and the upstream end portion being delimited downstream by an axial position so-called the extreme upstream point, a downstream portion, dimensioned to form a shroud of the suspension pylon of the turbine engine, and an intermediate portion connecting the upstream end portion to the downstream portion, comprising an upper surface wall extending between an extreme upstream point and an extreme downstream point with a predetermined axial position, wherein the extreme upstream point is situated at a distance, in the axial direction, from the leading edge of the arm comprised between 0.2c and 0.5c, where c is the length of the axial chord of the guide vane, the extreme downstream point is situated at a distance, in the axial direction, from the leading edge of the arm, greater than the length c of the axial chord of the guide vane, and in that the angle of the tangent to the upper surface wall at the extreme upstream point is equal to that of the tangent to the wall at the extreme downstream point to within a degree.

Advantageously but optionally, the guide assembly according to the invention further comprises at least one of the following features:

the extreme upstream point is situated at a distance, in the axial direction, from the leading edge of the arm, comprised between 0.2 and 0.3c, preferably equal to 0.3c.

the extreme downstream point is situated at a distance, in the axial direction, from the leading edge of the arm, greater than the length c of the axial chord of the guide vane.

The assembly comprises a plurality of structural arms, all with identical geometry.

The invention also has as its object a bypass turbine engine, comprising a guide according to the foregoing description.

The air flow guide assembly proposed has improved aerodynamic performance.

The axial position of the upstream end point of the transition zone and the angle of the tangent at this point make it possible to reduce the concavity of the upstream wall of the structural arm at this transition zone.

Hence, the air flow is slowed down slightly or not at all, which impedes the development of corner flows derived from the upstream end portion of the arm with a guide vane profile.

Thus, the recirculation zones are attenuated, or even annihilated, which makes it possible to reduce the total pressure losses in the guide on the order of 0.1%, as well as the level of static pressure distortion in the guide, on the order of 0.2%.

DESCRIPTION OF THE DRAWINGS

Other features, aims and advantages of the invention will be revealed by the description that follows, which is purely illustrative and not limiting, and which must be read with reference to the appended drawings wherein:

FIG. 2a shows an air flow guide assembly conforming to an embodiment of the invention.

DETAILED DESCRIPTION OF AT LEAST ONE EMBODIMENT OF THE INVENTION

Figure 1A:
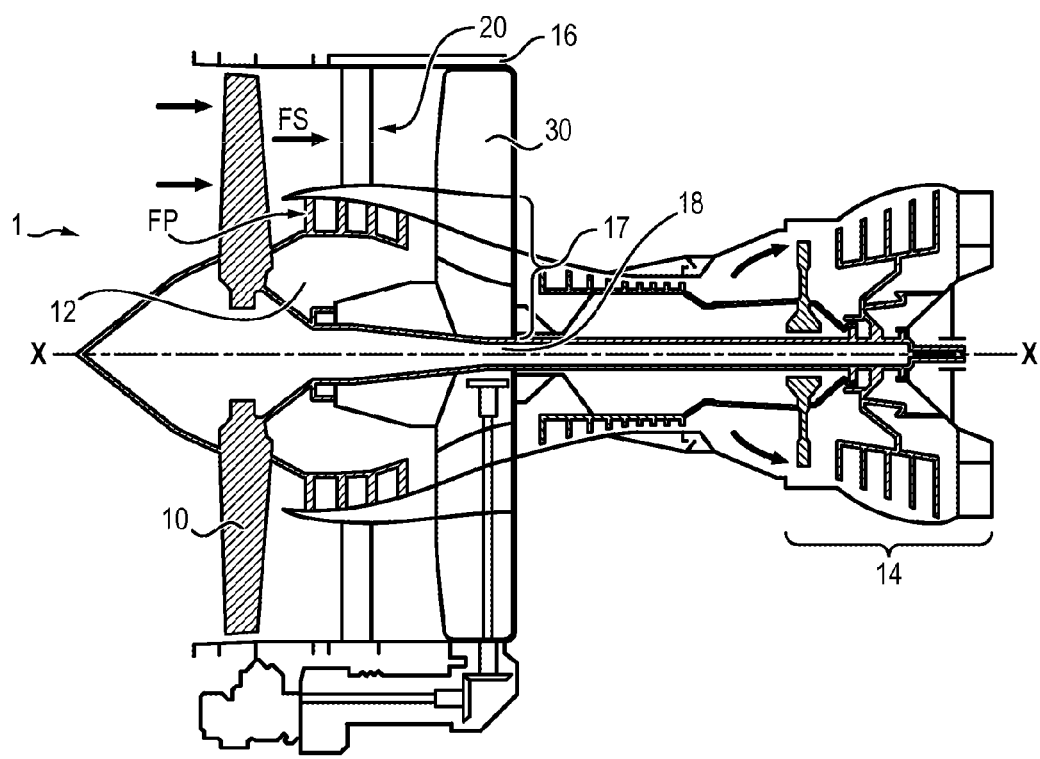
FIG. 1a, already described, shows schematically a bypass type turbine engine.
Figure 1B:
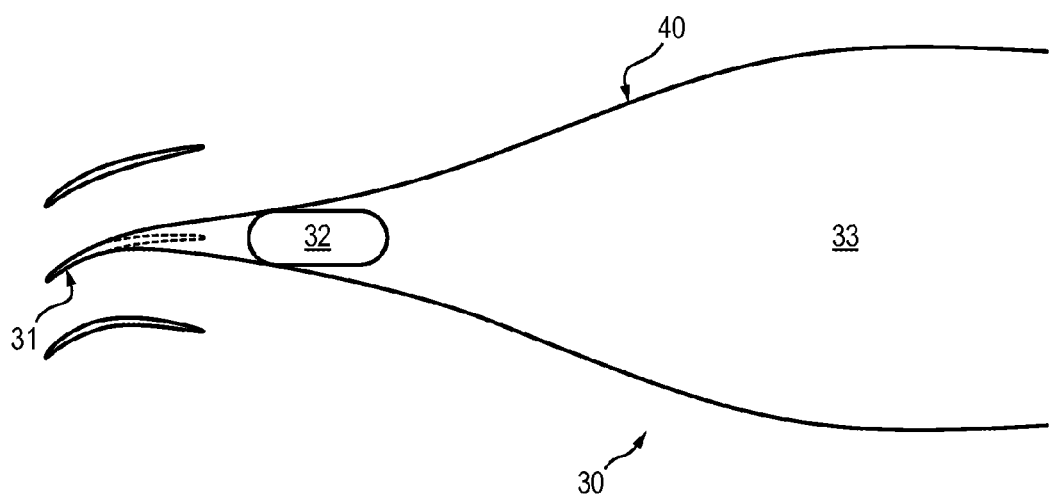
FIG. 1b, already described, shows a developed schematic view of an assembly comprising a structural arm between two secondary flow guide vanes, FIG. 1c, already described, shows the aerodynamic effects of a structural arm, the transition zone whereof between the upstream portion of the guide vane and the downstream portion of the structural arm proper has a pronounced concavity.
Figure 1C:
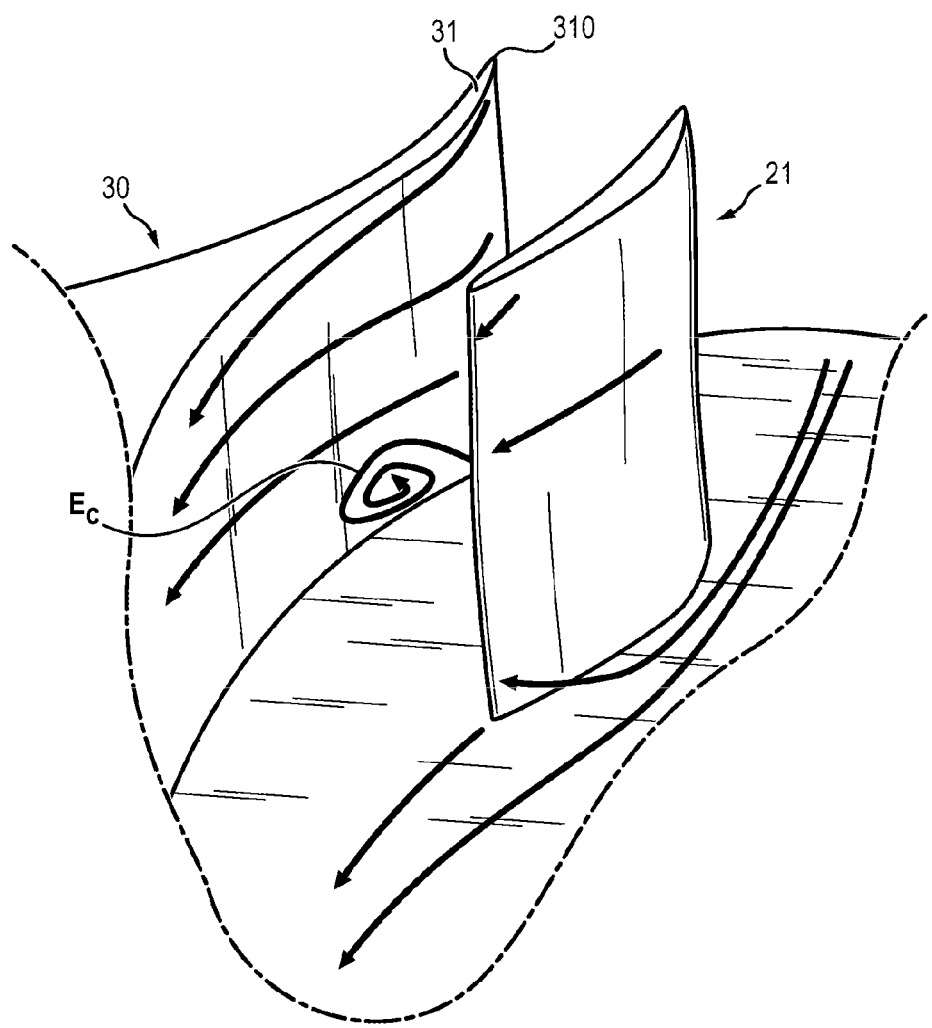
Figure 2B:
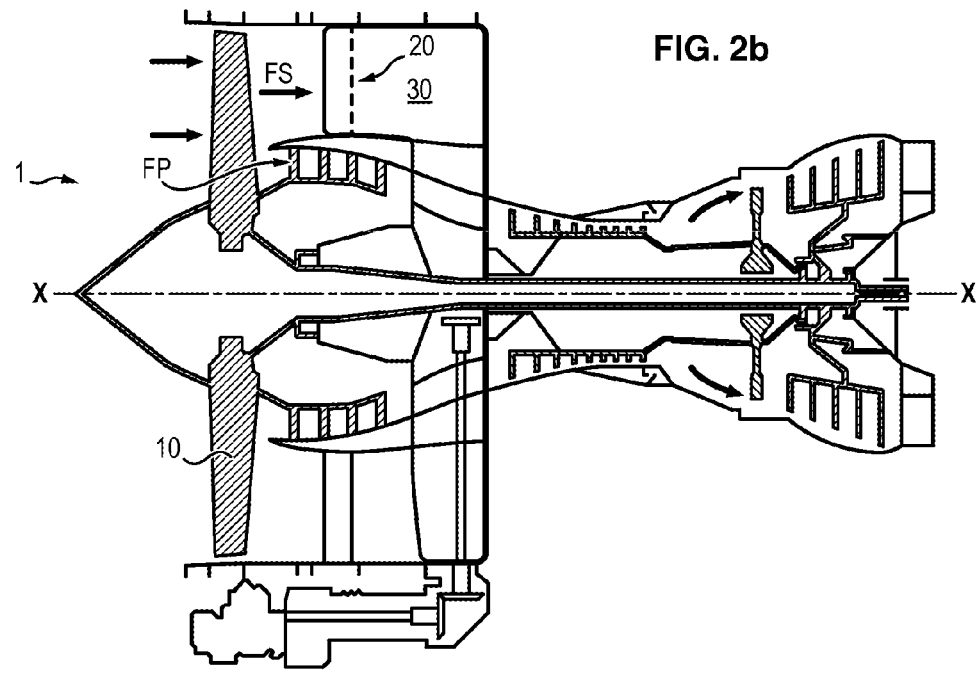
FIG. 2b illustrates schematically a turbine engine conforming to an embodiment of the invention.

With reference to FIG. 2b, a bypass turbine engine 1 is shown comprising, as previously described, a fan 10 and a guide 20 of the OGV type, to guide a secondary flow FS derived from the fan 10.

The guide 20 comprises a plurality of vanes 21 distributed regularly around a ring (not shown) centered on an axis X-X of the turbine engine, corresponding to the axis of the engine shaft.

In addition the turbine engine 1 comprises at least one structural arm 30 described in more detail hereafter. More precisely, the turbine engine 1 comprises a plurality of structural arms extending substantially radially around the axis X-X. One of these structural arms 30 has as its function to provide a shroud to a pylon (not shown) allowing the engine to be suspended from the wing of the airplane on which it is mounted, and which is dimensioned to support the weight of the engine. The pylon also serves as a crossing point for certain utilities.

The structural arm which shrouds the suspension pylon of the engine extends in a vertical direction between the wing of the airplane and the axis X-X of the turbine engine. Viewing the turbine engine from the front or the rear in the direction of the axis, this arm extends at "twelve o'clock."

The turbine engine 1 can include at least one other structural arm 30, arranged for example at "six o'clock", i.e. vertically, and between the axis X-X and the ground, by being aligned with the first structural arm. This structural arm 30 is not used to shroud a suspension pylon of the engine, but nevertheless has an identical shape with the first arm described above. The turbine engine can also include one or more other structural arms 30, identical with the first arm described above.

In FIG. 2a is shown a developed view of an angular sector around the axis X-X covered by two vanes 21 of the guide, between which is located a structural arm 30. Each vane situated on either side of the arm 30 defines with it an air flow stream in which the air is displaced from upstream to downstream, represented in the figure from left to right.

Hereafter, the terms upstream and downstream are always used with respect to the direction of the air flow in the turbine engine, and in particular with respect to the air flow in the streams, from left to right in the figure.

An assembly comprising at least one of the structural arms 30 of the turbine engine, and the guide, is also called an air flow guide assembly. The geometry of the arm described hereafter makes it possible to improve the flow of air between the arm and a vane 21 of the guide 20 situated on the upper surface of the arm.

Each vane 21 conventionally comprises a leading edge 22 and a trailing edge 23. The axial chord of a vane 21 is the segment extending parallel to the axis X-X, from the axial position of the leading edge 22 to the axial position of the trailing edge 23. The length of the axial chord of the vanes 21 is denoted c.

The structural arm 30 is of the "integrated guide vane" type, i.e. it comprises an upstream end portion 31 having the profile of a guide vane. Thus, the upstream end portion 31 of the structural arm 30 is present identically at the upstream end of each vane 21 of the guide 20.

In particular, the upstream end portion 31 has a leading edge 310 aligned with that of the vanes 21 of the guide 20, i.e. at the same level with respect to the axis X-X, and has, at least at its leading edge, the same thickness and the same camber angle as a vane 21 of the guide 20, the camber angle being the angle between the camber line, halfway between the lower surface and the upper surface of a vane 21, with the axis X-X.

The upstream end portion 31 of the structural arm 30 is delimited axially downstream by a point A and upstream by the leading edge 310. The entire portion of the arm 30 extending axially, from the leading edge 310 to the point A is therefore geometrically constrained to be identical to the portion of the vanes 21 of the guide extending from the leading edge of each vane to a section located at the same axial position as the point A.

The structural arm 30 also comprises a downstream portion 33, and an intermediate portion 34 connecting the upstream end portion with the downstream portion 33.

As indicated earlier, the structural arm 30 is advantageously of the "main" arm type indicated earlier, the main function whereof is to support the turbine engine below the wing of the airplane while supporting the forces generated by the weight of the turbine engine, or in any case it has a geometry identical to that of a main arm shrouding an engine support pylon.

This function is carried out by the downstream portion 33, the walls whereof are advantageously made by casting to support these considerable forces.

In addition, the geometry of the downstream portion 33 of the arm shrouding the pylon, and therefore of the downstream portion 33 of all the other arms 30 which are identical to it, is constrained by the aircraft manufacturer depending on the geometry of the pylon and the type of airplane on which the turbine engine is mounted. It is therefore considered generally that the downstream portion 33 of each structural arm of the assembly is dimensioned to be able to shroud the suspension pylon of the turbine engine, even if only the structural arm at twelve o'clock actually surrounds a suspension pylon.

The walls of the intermediate portion 34 have as their function to connect the upstream portion 31 with the downstream portion 33 while avoiding any discontinuity of surface or tangency. However, they are not required to support the weight of the turbine engine like those of the downstream portion 33. Consequently, they are advantageously made of sheet metal so as to lighten the weight of the turbine engine.

Moreover, the intermediate portion 34 can include a zone 32 called a keep-out zone, which is a housing dedicated to the installation of utilities, and particularly to the housing of lines, for oil or fuel for example, of electrical connections, or of transmission shafts, etc. if required.

The structural arm 30 includes an upper surface wall 40 formed by:
  An upper surface wall 41 of the upstream end portion,
  An upper surface wall 44 of the intermediate portion 34, and
  An upper surface wall 43 of the downstream portion 33.

The upper surface wall 44 of the intermediate portion is delimited by two extreme points, respectively upstream by the point A and downstream by the point B, called the extreme downstream point.

The extreme upstream point A is located at the connection between the upper surface walls of the upstream end portion 41 and the intermediate portion 44. As indicated earlier, the upstream end portion 31 of the arm is constrained to be identical to a corresponding upstream portion of a vane 21. Consequently, at a fixed axial position (with respect to the axis X-X) of a point on the upper surface wall 41 of the upstream portion, the position of this point in azimuth (axis y in the figure) is also fixed.

The extreme downstream point B is located at the connection between the upper surface walls of the intermediate portion 44 and the downstream portion 43. The axial position of the extreme downstream point B is located upstream of the upstream end of the turbine engine suspension pylon.

The geometry described hereafter for the structural arm allows the upper surface wall of the intermediate portion 34 to be as little concave as possible to reduce the recirculation of air.

In the first place, the axial position $x_B$ of the extreme point B must occur at a distance from the axial position of the leading edge of the arm greater than or equal to the length of the chord of a vane 21, and preferably strictly greater.

This is denoted:

$$x_B \geq c$$

By taking as the origin of the axis X-X the axial position of the leading edge of the arm and of the vanes.

In fact, the greater the axial distance between the point B and the point A, the more the transition achieved by the wall of the intermediate portion 44 is gentle and limits concavities.

Moreover, the axial position $x_A$ of the extreme upstream point A is preferably at a distance, measured in the direction of the axis X-X, from the axial position of the leading edge 310 of the arm, comprised between 0.2c and 0.5c.

This is denoted:

$$0.2c \leq x_A \leq 0.5c$$

The fact that the point A is located at an axial distance from the leading edge 310 of at least 20% of the chord allows the upstream end portion 31 of the arm to be sufficiently long to have an effect on the entering air flow similar to that of a guide vane 21. In particular, this limits the static pressure distortion on the guide assembly 20, and propagation of pressure distortions to the fan upstream of the guide. The acoustic and aerodynamic performance of the fan are therefore improved.

Moreover, the fact that the point A is located at an axial distance from the leading edge smaller than 50% of the length of the chord of a vane allows it, on the one hand, to be sufficiently separated from the point B, which extends the length of the intermediate portion and allows its concavity to be reduced.

On the other hand, positioning the point A beyond this axial distance would bring it closer to the keep-out zone 32. Consequently, the upper surface wall 44 of the intermediate portion would have to have increased concavity to circumvent this zone and connect to the point B, which would cause recirculation of air at this wall.

Preferably, the axial position $x_A$ of the extreme upstream point A is even at a distance from the leading edge 310 less than 0.3c and very advantageously equal to 0.3c, to optimize the effects described above.

In addition, the angle $\alpha_A$ of the tangent to the upper surface wall 40 of the arm 30 with respect to the axis X-X at point A is advantageously close to that, $\alpha_B$, of the tangent to the wall 40 at point B.

Preferably, the angle $\alpha_A$ is equal to the angle $\alpha_B$ to within a degree—$\alpha_A$ therefore being able to take on all values between $\alpha_B-1$ and $\alpha_B+1$:

$$\alpha_A = \alpha_B \pm 1°$$

Thus, the concavity of the upper surface wall 44 of the intermediate portion is minimized.

If necessary, the angle $\alpha_B$ of the tangent to point B, and/or the position, on an axis orthogonal to the axis X-X, of the point B, which are normally imposed depending on the geometry of the downstream portion 33 of the structural arm, and of the position in azimuth of the arm 30 with respect to the guide, can be slightly adjusted so as to comply with the relation above, because this relation corresponds to:

$$\tan\alpha_A = \tan(\alpha_B \pm 1°) \approx \frac{y_{AB}}{x_{AB}}$$

where $y_{AB}$ is the distance, measured on an axis orthogonal to the axis X-X, between the point A and the point B, and $x_{AB}$ is the distance, measured axially, i.e. parallel to the axis X-X, between these same points.

Figure 3:
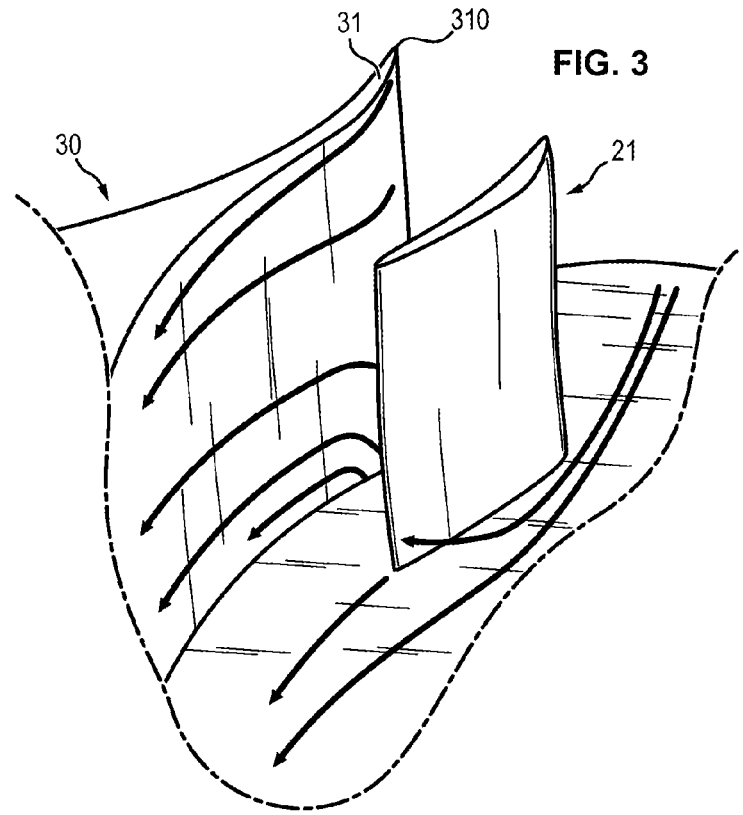
FIG. 3 shows schematically the air flow between a structural arm and a guide vane shown at the upper surface thereof.

With reference to FIG. 3, the flow of air in a guide assembly comprising a guide 20 and a structural arm 30 conforming to the geometry described above is shown, the structural arm being viewed on its upper surface side looking upstream.

It is noted that, rather than trying to thin the arm so as to reduce its aerodynamic obstruction, it is preferably to thicken the upper surface portion by reducing the concavity of the wall 44 at the intermediate portion 34, to limit the occurrence of recirculation.

The invention claimed is:

1. A turbine engine assembly comprising a pylon for suspending a turbine engine from a wing of an aircraft, the assembly comprising:
   a guide comprising a vane, the vane comprising a leading edge and a trailing edge; and
   a structural arm,
   wherein the vane and the structural arm extend radially around an axis of the turbine engine, and the structural arm has:
      an upstream end portion with respect to an air flow direction in the turbine engine, the upstream end portion comprising a leading edge aligned circumferentially with the leading edge of the vane, and having a profile identical with that of an upstream end of the vane, the upstream end portion being delimited downstream by an axial position at an extreme upstream point,
      a downstream portion, dimensioned to form a shroud of the pylon of the turbine engine, and
      an intermediate portion connecting the upstream end portion to the downstream portion, the intermediate portion comprising a continuous upper surface wall extending between the extreme upstream point and an extreme downstream point with a predetermined axial position, the continuous upper surface wall being concave including in a region adjacent and upstream of the extreme downstream point,
   wherein the extreme upstream point is situated at a distance, in an axial direction, from the leading edge of the structural arm comprised between 0.2c and 0.5c, where c is a length of an axial chord of the vane,
   wherein the extreme downstream point is situated at a distance, in the axial direction, from the leading edge of the structural arm, greater than the length c of the axial chord of the vane, and
   wherein a first angle of a tangent to the upper surface wall at the extreme upstream point is equal to a second angle of a tangent to the upper surface wall at the extreme downstream point to within a degree, a tangent of the first angle being equal to a first distance between the extreme upstream point and the extreme downstream point measured on an axis orthogonal to an axis of the turbine engine divided by a second distance between the extreme upstream point and the extreme downstream point measured on an axis parallel to the axis of the turbine engine.

2. The air flow guide assembly according to claim 1, wherein the extreme upstream point is situated at a distance, in the axial direction, from the leading edge of the arm, comprised between 0.2 and 0.3c.

3. The air flow guide assembly according to claim 2, wherein the extreme upstream point is situated from the leading edge of the arm at a distance equal to 0.3c in the axial direction.

4. The air flow guide assembly according to claim 1, comprising a plurality of structural arms, all with identical geometry.

5. A bypass type turbine engine, comprising an assembly according to claim 1.

6. The air flow guide assembly according to claim 1, wherein the extreme downstream point is located upstream of an upstream end of the pylon.

7. The air flow guide assembly according to claim 1, wherein the intermediate portion includes a housing for installation of utilities.

* * * * *